United States Patent
Sugaya

(10) Patent No.: US 10,636,174 B2
(45) Date of Patent: Apr. 28, 2020

(54) ABNORMALITY DETECTION SYSTEM, ABNORMALITY DETECTION METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/518,038

(22) Filed: Jul. 22, 2019

(65) Prior Publication Data

US 2019/0340789 A1 Nov. 7, 2019

Related U.S. Application Data

(63) Continuation-in-part of application No. PCT/JP2017/007805, filed on Feb. 28, 2017.

(51) Int. Cl.
*G06T 7/90* (2017.01)
*B64C 39/02* (2006.01)
*G06T 7/00* (2017.01)

(52) U.S. Cl.
CPC .............. *G06T 7/90* (2017.01); *B64C 39/024* (2013.01); *G06T 7/0002* (2013.01); *B64C 2201/123* (2013.01); *B64C 2201/127* (2013.01); *G06T 2207/10024* (2013.01)

(58) Field of Classification Search
CPC .... G06T 7/73; G06T 7/74; G06T 7/90; G06T 7/0002; G06T 2207/10024; G06T 2207/20084; G06T 2207/10004; G06T 2207/10032; G06T 2207/30188; B64C 2201/123; B64C 2201/127; G06K 9/00624; G06K 9/00657; G06K 9/4661

USPC .......................................................... 382/165
See application file for complete search history.

(56) References Cited

U.S. PATENT DOCUMENTS

| | | | |
|---|---|---|---|
| 9,984,455 B1* | 5/2018 | Fox | B64D 47/08 |
| 2014/0064554 A1* | 3/2014 | Coulter | G06K 9/3216 382/103 |
| 2017/0154425 A1* | 6/2017 | Pierce | G06K 9/4671 |
| 2018/0157911 A1* | 6/2018 | Lo | G06K 9/00657 |
| 2019/0026540 A1* | 1/2019 | Tahara | G06K 9/00255 |
| 2019/0033958 A1* | 1/2019 | Hsiao | G06F 3/011 |
| 2019/0068962 A1* | 2/2019 | Van Schoyck | G01C 21/20 |
| 2019/0286905 A1* | 9/2019 | Ritter | G06T 7/11 |

FOREIGN PATENT DOCUMENTS

| | | |
|---|---|---|
| JP | H08-30765 | 2/1996 |
| JP | 2002-352340 | 12/2002 |
| JP | 2003-6276 | 1/2003 |
| JP | 2009-169717 | 7/2009 |
| JP | 2016-186682 | 10/2016 |

* cited by examiner

Primary Examiner — Ali Bayat
(74) Attorney, Agent, or Firm — Lex IP Meister, PLLC

(57) ABSTRACT

An erroneous detection due to light irradiation is avoided when photographing a farm or sea surface and analyzing the photographed image to detect an abnormality. When detecting an abnormality of an analysis target by analyzing image data photographed in a state where light is being irradiated, it is determined whether the abnormality of the analysis target is erroneously detected according to an irradiation state of the light in the image data, and a drone 10 is instructed to re-photograph when there is the erroneous detection.

5 Claims, 2 Drawing Sheets

ABNORMALITY DETECTION SYSTEM, ABNORMALITY DETECTION METHOD, AND PROGRAM

CROSS-REFERENCE TO RELATED APPLICATION

This application is a continuation-in-part of PCT Application No. PCT/JP2017/007805 filed on Feb. 28, 2017, the entire contents of which are incorporated herein by reference.

BACKGROUND

(a) Field

The present invention relates to an abnormality detection system, an abnormality detection method, and a program for analyzing a photographed image to detect an abnormality.

(b) Description of the Related Art

With the recent IoT (Internet of Things), in primary industries such as agriculture or fishery, there are attempts to place sensors or cameras on the site and acquire big data. It is possible to remotely know the quality of crops or the environment of farms or fishing grounds without going to the actual site, by learning the acquired data or images using artificial.

For example, Patent Document 1 discloses a livestock consulting system which performs consulting by performing an image analysis on images acquired from a farm to obtain a breeding environment for livestock.

Patent Document 1: Japanese patent application publication No. 2003-6276

However, in such a conventional method, when an image analysis is performed, the analysis result changes depending on an irradiation condition of sunlight at the time of photographing. For example, when an image of a sea surface is photographed, a color of the sea surface indicated by RGB values may differ depending on the state of illumination, or a reflected portion of sunlight or moonlight may be recognized as white. Therefore, when an abnormality detection on the sea surface is performed by using such an image analysis result, an erroneous detection may occur.

For example, when photographing seaweed on the sea surface and detecting an abnormality due to red rots, the white portion such as sunlight reflection is recognized as the abnormality. In addition, not only when the color can be clearly recognized as in the case of the white, but also when the color of the sea surface is slightly different depending on the irradiation condition, it may be undesirable to detect the abnormality.

SUMMARY

Therefore, an embodiment of the present invention is to provide an abnormality detection system, an abnormality detection method, and a program that avoids an erroneous detection due to light irradiation when photographing a farm or sea surface and analyzing the photographed image to detect an abnormality.

An embodiment of the present invention provides the following solutions.

An embodiment of the present invention provides an abnormality detection system including an abnormality detection unit that detects an abnormality of an analysis target by analyzing image data photographed in a state where light is being irradiated, and an erroneous detection determination unit that determines whether the abnormality of the analysis target is erroneously detected according to an irradiation state of the light in the image data.

According to an embodiment of the present invention, the abnormality of the analysis target is detected by analyzing image data photographed in a state where light is being irradiated, and it is determined whether the abnormality of the analysis target is erroneously detected according to an irradiation state of the light in the image data.

Therefore, according to an embodiment of the present invention, it is possible to avoid an erroneous detection due to light irradiation when photographing a farm or sea surface and analyzing the photographed image to detect an abnormality.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Configuration of Drone 10 and Abnormality Detection Computer 100

Figure 1:
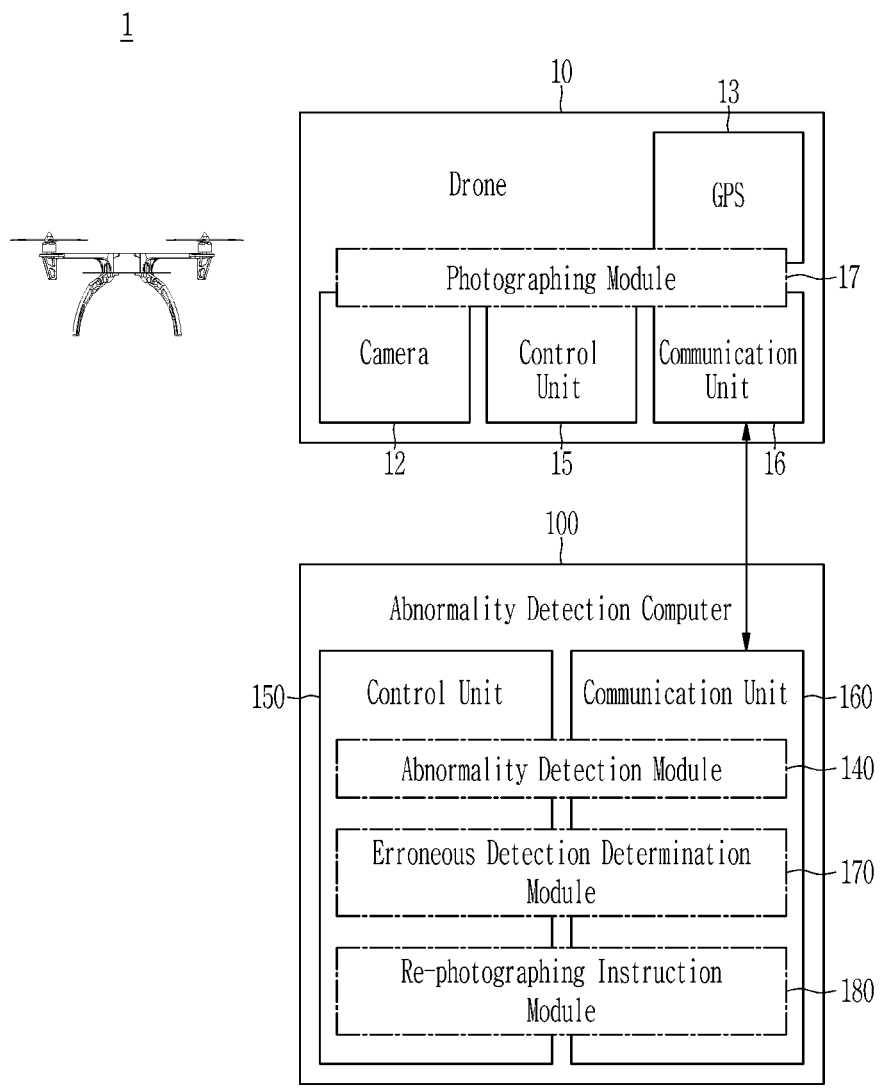
FIG. 1 shows a functional block diagram of a drone 10 and an abnormality detection computer 100.

FIG. 1 is a block diagram for explaining a hardware configuration and software functions of a drone 10 and an abnormality detection computer 100 according to an embodiment of the present invention. The drone 10 and the abnormality detection computer 100 are communicably connected, and can perform predetermined data communication. Further, a system including the drone 10 and the abnormality detection computer 100 is referred to as an abnormality detection cloud system 1.

The drone 10 is an unmanned moving device, and may be, for example, an unmanned aircraft or a moving device moving on wheels. The drone 10 flies on a field such as a farm, a sea, an upland field, a paddy field, a forest, or a city, and photographs the field. The drone 10 sequentially transmits the photographed data to an external computer such as the abnormality detection computer 100 or the like.

As shown in FIG. 1, the drone 10 includes a camera 12 that captures an image of an analysis target in a state where light is irradiated, a GPS 13 that detects current position information, a control unit 15 that controls data, and a communication unit 16 that transmits and receives data. A photographing module 17 is realized by reading a predetermined program stored in the control unit 15 and by the cooperation of the camera 12 and the communication unit 16.

The drone 10 includes a normal video camera 12 capable of capturing a still image or a moving image or a camera 12 capable of photographing continuously, such as a still camera, a charge-coupled device (CCD) camera, a complementary MOS (CMOS) camera, or the like. In addition, the drone 10 may be attached to a communication terminal such as a computer or smartphone equipped with a camera.

The control unit 15 includes a processor such as a central processing unit (CPU), a random access memory (RAM), a read only memory (ROM), and the like. The communication unit 16 may be a communication device capable of wirelessly communicating with a predetermined controller, a base station, a router, a computer or the like.

The GPS 13 detects current position information when the drone 10 moves. The control unit 15 reads a predetermined program, thereby associating the position information detected by the GPS 13 with the image data captured by the camera.

The abnormality detection computer 100 is a computer or server capable of communicating with the moving device for performing photographing by the camera, such as the drone 10, and includes at least a control unit 150 that performs data control, operation and storage such as an image analysis, and a communication unit 160 that communicates with the computer. The control unit 150 reads a predetermined program thereby realizing an abnormality detection module 140, an erroneous detection determination module 170, and a re-photographing instruction module 180 in cooperation with the communication unit 160.

The abnormality detection computer 100 includes, as a control unit 150, a processor such as a central processing unit (CPU), a random access memory (RAM), a read only memory (ROM), and the like, and includes, as a communication unit 150, a communication device. The communication device is, for example, a WiFi compliant device conforming to IEEE 802.11 or a wireless device conforming to the IMT-2000 standard such as a third to fifth generation mobile communication system.

Each function of the abnormality detection computer 100 may be configured by a plurality of computers, and the abnormality detection computer 100 forms an abnormality detection system by one or more computers.

Abnormality Detection Process

Figure 2:
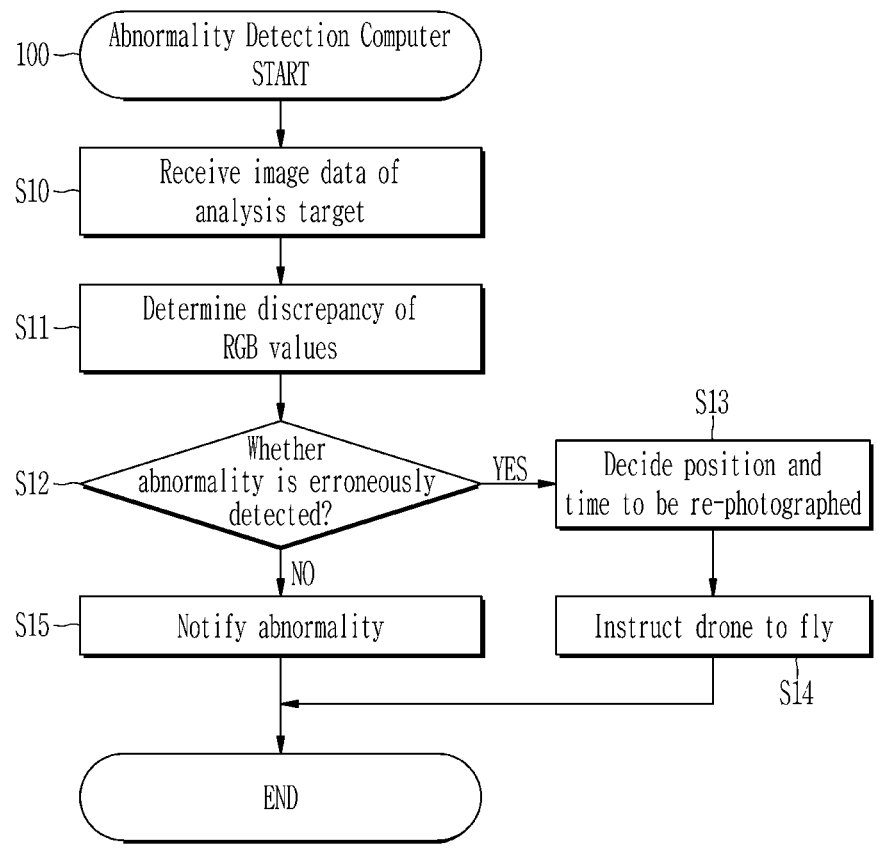
FIG. 2 shows an abnormality detection process executed by an abnormality detection computer 100.

FIG. 2 is a flowchart of an abnormality detection process executed by a drone 10 and an abnormality detection computer 100 according to an embodiment of the present invention. Processing executed by each hardware and software module described above is described together with this processing.

First, a drone 10 starts to move and photographs a field such as a farm, a sea, or a river from above and from the ground. This image data is data photographed in a state in which the field is irradiated by sunlight or moonlight (in addition, artificial light such as illumination may be used). The drone 10 transmits the image data to an abnormality detection computer 100 at a predetermined timing. In response to this, the abnormality detection computer 100 receives the image data of an analysis target (step S10).

Next, an abnormality detection module 140 analyzes the received image data to detect an abnormality in the photographed field. Specifically, the abnormality detection module 140 determines a discrepancy of RGB values (step S11). The abnormality detection by the image analysis is detection which determines that an analysis target in an image is in a state different from normal (abnormality) when image data different from image data that is normally predicted is acquired. For example, in one piece of still image data obtained by photographing a field, RGB values of the entire image are acquired, and a numerical value of the RGB values, such as an average value or a variance value is obtained. This value is compared with a statistical average value or variance value of RGB values of image data that is normally predicted, and an abnormality is detected if the value is data which has the statistical discrepancy. For example, when a difference between the numerical value of the acquired RGB values and the statistical numerical value is greater than a threshold value which is statically determined, the abnormality may be detected.

For example, in a case where a seaweed farm for cultivating seaweed is photographed, if the seaweed is red-rotted, a color of the seaweed may tend to become reddish purple and an average value of acquired RGB values of the entire image may be different from RGB values of an image of normal seaweed. In this case, an abnormality is detected.

Here, the image data may be every single image photographed as still images. In this case, each piece of the image data is associated with position information of a photographed position by a GPS 13. Therefore, each piece of the image data may be associated with the position information to form one piece of large image data such as a panoramic image. In both the former case and the latter case, the image data is divided into specific predetermined areas, and the image analysis is performed for each of the areas to detect the abnormality in the area.

Next, when the discrepancy of the RGB values is detected, an erroneous detection determination module 170 determines whether the discrepancy of the RGB values occurs due to the irradiation of light (step S12). That is, when the discrepancy of RGB values occurs due to the irradiation of light, it is determined that the abnormality is erroneously detected. In this determination, for example, it is determined that the occurrence of discrepancy due to light reflection is the erroneous detection when the RGB values of the sea surface indicate white. In addition, for example, in step S11, it may be determined whether there is the discrepancy, by comparing the RGB values with RGB values of image data obtained by photographing the sea surface at substantially the same month and date, at substantially the same position, and in substantially the same direction, instead of general RGB values of the sea surface. For example, it may be determined that there is the discrepancy when the difference between the both RGB values is greater than a threshold value which is statically determined.

When the erroneous detection determination module 170 determines that the abnormality is erroneously detected (YES in step S12), the re-photographing module 180 decides a position and time to be re-photographed by the drone 10 based on the position information of the image data of the area in which the abnormality is erroneously detected, in order to check the erroneous detection (step S13).

The time to be re-photographed may be arbitrarily decided by an administrator, but may be automatically set to a time taking into consideration the degree of light irradiation other than the time when the image data of the erroneous detection is acquired (three or four hours before or after the time when the image data). The re-photographing instruction module 180 instructs the drone 10 to fly so as to photograph the decided position at the decided time (step S14).

In addition, the time to be re-photographed may be not decided again, but the administrator may be notified that the position should be photographed at the timing when the drone 10 flies next time and the drone 10 may be instructed to photograph based on permission of the administrator.

If the erroneous detection determination module 170 determines that the abnormality is not erroneously detected (i.e., the abnormality is detected) (NO in step S12), it is notified that the abnormality is detected (step S15). Here, the notification of the abnormality may simply warn the abnormality, but may indicate a probability of abnormality by a numerical value.

The determination of the erroneous detection may be performed by learning image data which was erroneously detected in the past as teacher data and determining whether there is the erroneous detection based on the learning result.

According to an embodiment of the present invention, the erroneous detection of the abnormality can be reduced so that the accuracy of the abnormality detection can be improved, thereby bringing a technical improvement in the abnormality detection system.

The above-described means and functions are realized by reading and executing a predetermined program by a computer (including a CPU, an information processing device, or various terminals). The program may be provided, for example, in a form (SaaS: software as a service) provided from the computer via a network. Further, the program may be provided, for example, in a form recorded in a computer-readable recording medium such as a flexible disk, a CD (e.g., CD-ROM or the like), a DVD (DVD-ROM, DVD-RAM, or the like), a compact memory, or the like.

In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like, and be provided from the recording medium to the computer through a communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: abnormality detection cloud system, 10: drone, 100: abnormality detection computer

What is claimed is:
1. An abnormality detection system comprising:
an abnormality detection unit that acquires RGB values of an entire image by performing an image analysis on image data photographed in a state where light is being irradiated, obtains a numerical value including an average value or variance value of the RGB values, and detects an abnormality of an analysis target when determining that the numerical value is data which has a statistical discrepancy by comparing the numerical value with a statistical average value or variance value;
an erroneous detection determination unit that determines whether the abnormality of the analysis target is erroneously detected according to an irradiation state of the light in the image data, wherein the erroneous detection determining unit determines whether the abnormality of the analysis target is erroneously detected by detecting and determining the discrepancy of the RGB values due to irradiation of the light in an area within the image data; and
a re-photographing instruction unit that, when the discrepancy of the RGB values is detected in the area within the image data and it is determined that the abnormality of the analysis target is erroneously detected, instructs to re-photograph a position corresponding to the area.

2. The abnormality detection system according to claim 1, wherein the erroneous detection determination unit learns image data of the analysis target photographed in the past to determine an erroneous detection when detecting the abnormality of the analysis target.

3. An abnormality detection cloud system comprising:
a drone comprising a photographing unit that photographs an analysis target in a state where light is being irradiated; and
a computer communicably connected to the drone, the computer comprising:
an abnormality detection unit that acquires RGB values of an entire image by performing an image analysis on image data of the photographed analysis target from the drone, obtains a numerical value including an average value or variance value of the RGB values, and detects an abnormality of an analysis target when determining that the numerical value is data which has a statistical discrepancy by comparing the numerical value with a statistical average value or variance value;
an erroneous detection determination unit that determines whether the abnormality of the analysis target is erroneously detected according to an irradiation state of the light in the image data, wherein the erroneous detection determining unit determines whether the abnormality of the analysis target is erroneously detected by detecting and determining the discrepancy of the RGB values due to irradiation of the light in an area within the image data; and
a re-photographing instruction unit that, when the discrepancy of the RGB values is detected in the area within the image data and it is determined that the abnormality of the analysis target is erroneously detected, instructs to re-photograph a position corresponding to the area.

4. An abnormality detection method comprising:
photographing an analysis target in a state where light is being irradiated;
acquiring RGB values of an entire image by performing an image analysis on image data obtained by photographing the analysis target, obtaining a numerical value including an average value or variance value of the RGB values, and detecting an abnormality of an analysis target when determining that the numerical value is data which has a statistical discrepancy by comparing the numerical value with a statistical average value or variance value;
determining whether the abnormality of the analysis target is erroneously detected according to an irradiation state of the light in the image data, wherein it is determined whether the abnormality of the analysis target is erroneously detected by detecting and determining the discrepancy of the RGB values due to irradiation of the light in an area within the image data; and
when the discrepancy of the RGB values is detected in the area within the image data and it is determined that the abnormality of the analysis target is erroneously detected, instructing to re-photograph a position corresponding to the area.

5. A program stored on a non-transitory medium for causing a computer to execute:
acquiring RGB values of an entire image by performing an image analysis on image data photographed in a state where light is being irradiated, obtaining a numerical value including an average value or variance value of the RGB values, and detecting an abnormality of an analysis target when determining that the numerical value is data which has a statistical discrepancy by comparing the numerical value with a statistical average value or variance value;

determining whether the abnormality of the analysis target is erroneously detected according to an irradiation state of the light in the image data, wherein it is determined whether the abnormality of the analysis target is erroneously detected by detecting and determining the discrepancy of the RGB values due to irradiation of the light in an area within the image data; and when the discrepancy of the RGB values is detected in the area within the image data and it is determined that the abnormality of the analysis target is erroneously detected, instructing to re-photograph a position corresponding to the area.

\* \* \* \* \*